United States Patent
Du et al.

(10) Patent No.: US 11,245,283 B2
(45) Date of Patent: Feb. 8, 2022

(54) CIRCUIT AND METHOD FOR CONTROLLING BRIGHTNESS OF EMERGENCY LIGHTING LUMINAIRES BY A SWITCH

(71) Applicant: Shanghai Sinceretek Microelectronics Technology Co., Ltd., Shanghai (CN)

(72) Inventors: Hongyue Du, Shanghai (CN); Siyuan Xu, Shanghai (CN)

(73) Assignee: SHANGHAI SINCERETEK MICROELECTRONICS TECHNOLOGY CO, LTD., Shanghai (CN)

( * ) Notice: Subject to any disclaimer, the term of this patent is extended or adjusted under 35 U.S.C. 154(b) by 1 day.

(21) Appl. No.: 17/037,706

(22) Filed: Sep. 30, 2020

(65) Prior Publication Data

US 2021/0119478 A1  Apr. 22, 2021

(30) Foreign Application Priority Data

Oct. 17, 2019 (CN) .......................... 201910988686.2

(51) Int. Cl.
 *H02J 9/00* (2006.01)
 *H02J 9/06* (2006.01)
 *H05B 45/10* (2020.01)
 *H02J 7/00* (2006.01)
 *H02J 7/04* (2006.01)

(52) U.S. Cl.
 CPC ............ *H02J 9/065* (2013.01); *H02J 7/0029* (2013.01); *H02J 7/04* (2013.01); *H05B 45/10* (2020.01); *H02J 2207/20* (2020.01)

(58) Field of Classification Search
 CPC .. H02J 9/065; H02J 7/0029; H02J 7/04; H02J 2207/20; H05B 45/10
 USPC .......................................................... 307/20
 See application file for complete search history.

(56) References Cited

U.S. PATENT DOCUMENTS

2017/0310160 A1*  10/2017  Wan .................... H05B 45/382
2018/0058677 A1*  3/2018  Wu ..................... H05B 45/375

* cited by examiner

*Primary Examiner* — Daniel Cavallari
*Assistant Examiner* — Dru Parries
(74) *Attorney, Agent, or Firm* — Bayramoglu Law Offices LLC

(57) ABSTRACT

A circuit includes an emergency lighting system and an AC/DC converter. An output terminal of the emergency lighting system is electrically connected to a LED load, and the other output terminal DIM of the emergency lighting system is electrically connected to a switch S2. The switch S2 is controlled by the emergency lighting system. The emergency lighting system includes an AC input detection module, a switching time detection module and a lithium battery. The AC input detection module is electrically connected to a neutral wire VN and a live wire VL. The switching time detection module is electrically connected between an output terminal of the AC input detection module and the terminal DIM. An output terminal of the AC/DC converter is electrically connected to a positive electrode of the lithium battery, and the other output terminal of the AC/DC converter is electrically connected to the LED load.

14 Claims, 2 Drawing Sheets

CIRCUIT AND METHOD FOR CONTROLLING BRIGHTNESS OF EMERGENCY LIGHTING LUMINAIRES BY A SWITCH

CROSS REFERENCE TO THE RELATED APPLICATIONS

This application is based upon and claims priority to Chinese Patent Application No. 201910988686.2, filed on Oct. 17, 2019, the entire contents of which are incorporated herein by reference.

TECHNICAL FIELD

The present invention relates to the technical field of circuit, in particular to a circuit for controlling the brightness of an emergency lighting luminaire by a switch, and the method thereof.

BACKGROUND

For simply controlling an emergency lighting system, a switch used for turning luminaires on and off is provided for an emergency lighting system. For example, in the emergency lighting system shown in FIG. 1, when the switch is closed the alternating current (AC) network power supply normally supplies the AC network, and the emergency lighting control chip detects the AC network voltage and turns off the emergency lighting. The AC/DC converter charges the battery while supplying power to the output LED. If the AC network stops supplying the power to the system, there is low resistance between the neutral wire VN and the live wire VL and there is no AC high-voltage signal. This low resistance is detected by the emergency lighting control chip and the emergency lighting is turned on.

When the switch is open, regardless of whether the AC power supply on, the emergency lighting control chip cannot detect the AC network voltage, and can detect the high resistance between VN and VL. In this case, the emergency lighting control chip turns off the emergency lighting.

FIG. 1 shows the circuit, having the simply controlled emergency lighting control system. When the system is working in an emergency lighting state, the drive current of the emergency lighting is a fixed drive current and cannot be changed. Thus, the system has two disadvantages as follows: 1) in the emergency lighting state, the actual lighting brightness of the luminaires is different during different working conditions; 2) since the battery is used to supply the power for the emergency lighting luminaires the users need to change the drive current of the emergency lighting to reduce the brightness. This reduction in brightness will prolong the working time of the emergency lighting luminaire.

SUMMARY

In order to solve the above technical problem, the present invention provides a circuit for controlling the brightness of an emergency lighting luminaire by a switch, and the method thereof. Without increasing the complexity of the system, the user can realize the dimming function of the emergency lighting luminaire under the emergency lighting condition. This allows for changing the brightness of the emergency lighting luminaire and extending the emergency working time of the emergency lighting luminaire according to actual lighting requirements.

To achieve the above purpose, the present invention is achieved by the following technical solution:

A circuit for controlling charging of an emergency lighting luminaire by a switch includes an emergency lighting system and an AC/DC converter. An output terminal of the emergency lighting system is electrically connected to an LED load, and the other output terminal DIM of the emergency lighting system is electrically connected to a switch S2. The switch S2 is controlled by the emergency lighting system. The emergency lighting system includes an AC input detection module, a switching time detection module and a lithium battery. The AC input detection module is electrically connected to a neutral wire VN and a live wire VL. The AC input detection module is configured to detect an AC network voltage and the state of a power network switch S1. The switching time detection module is electrically connected between an output terminal of the AC input detection module and the output terminal DIM. An output terminal of the AC/DC converter is electrically connected to a positive electrode of the lithium battery, and the other output terminal is electrically connected to the LED load. The LED load is connected to ground after connecting a resistor R1 in series. A resistor R2 is connected in series with the switch S2 and then connected in parallel with the resistor R1.

Preferably, the emergency lighting system further includes a battery protection management module. The battery protection management module is electrically connected to a positive end and a negative end of the lithium battery. The battery protection management module includes a battery overcharge protection module, an overcurrent and output short circuit protection module and a battery overdischarge protection module.

The improvement of the solution is that the battery protection management module can control the charging, discharging and protection state of the battery by detecting the battery voltage.

Preferably, the circuit for controlling the brightness of the emergency lighting luminaire by the switch includes a rectifier bridge BR. Two AC input terminals of the rectifier bridge BR are connected to the live wire VL and the neutral wire VN, respectively. The live wire VL is connected to the AC input terminals of the rectifier bridge BR through the switch S1. An output positive terminal of the rectifier bridge BR is connected to a voltage bus (VBUS) interface, and an output negative terminal is connected to ground. The VBUS interface is connected to a capacitor C1, and to an input terminal of the AC/DC converter.

Preferably, when the switch S1 is closed, the AC input detection module detects that an impedance between the live wire VL and the neutral wire VN is in a low resistance state; when the switch S1 is open. The AC input detection module detects that the impedance between the live wire VL and the neutral wire VN is in a high resistance state.

More preferably, the switching time detection module is configured to predetermine a time Toff. When the switching time detection module detects that a time period T for maintaining the impedance between the live wire VL and the neutral wire VN in the high resistance state by a "low resistance to high resistance to low resistance" state switching mode is less than the time Toff, the DIM outputs a low level. When the time period T is greater than or equal to the time Toff, the DIM outputs a high level.

More preferably, when the DIM outputs the low level, the emergency lighting system controls the switch S2 to be open. When the DIM outputs the high level, the emergency lighting system controls the switch S2 to be closed.

A method for controlling the brightness of an emergency lighting luminaire by a switch includes. The above-mentioned circuit for controlling the brightness of the emergency lighting luminaire by the switch, such that the emergency lighting system changes the current limiting resistor of the LED load by controlling the state of the switch S2. This then changes the brightness of the LED load.

Preferably, when the switch S2 is open, the current limiting resistor of the LED load is R1 When the switch S2 is closed, the current limiting resistor of the LED load is R1//R2.

Compared with the prior art, the present invention has the following advantages.

The circuit and method for controlling the brightness of an emergency lighting luminaire by the switch of the present invention can change the lighting power using the original control switch without increasing the control complexity of the existing emergency lighting system. Also, the dimming function of the emergency lighting luminaire during the emergency lighting operation can be used to prolong the working time of the emergency lighting.

DETAILED DESCRIPTION OF THE EMBODIMENTS

In order to clearly illustrate the present invention, the content of the present invention will be further described in conjunction with the drawings and embodiments. However, the present invention is not limited to the following embodiments.

Embodiment

Figure 1:
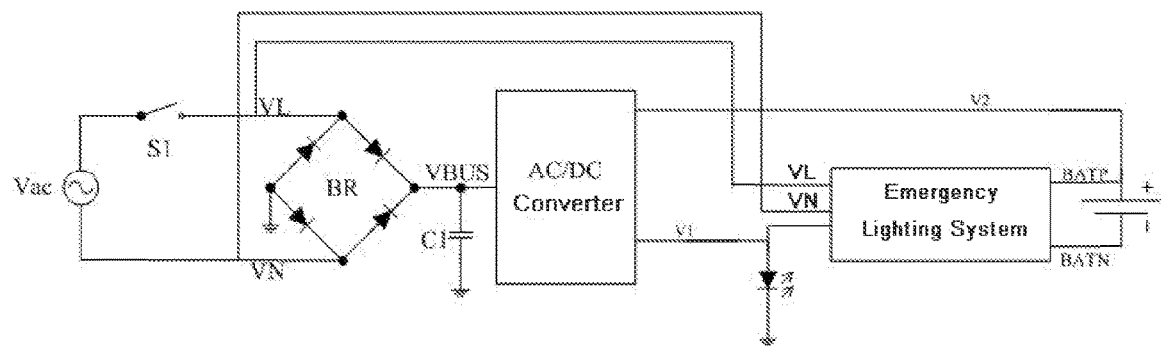
FIG. 1 is a circuit diagram of an emergency lighting system in the prior art.
Figure 2:
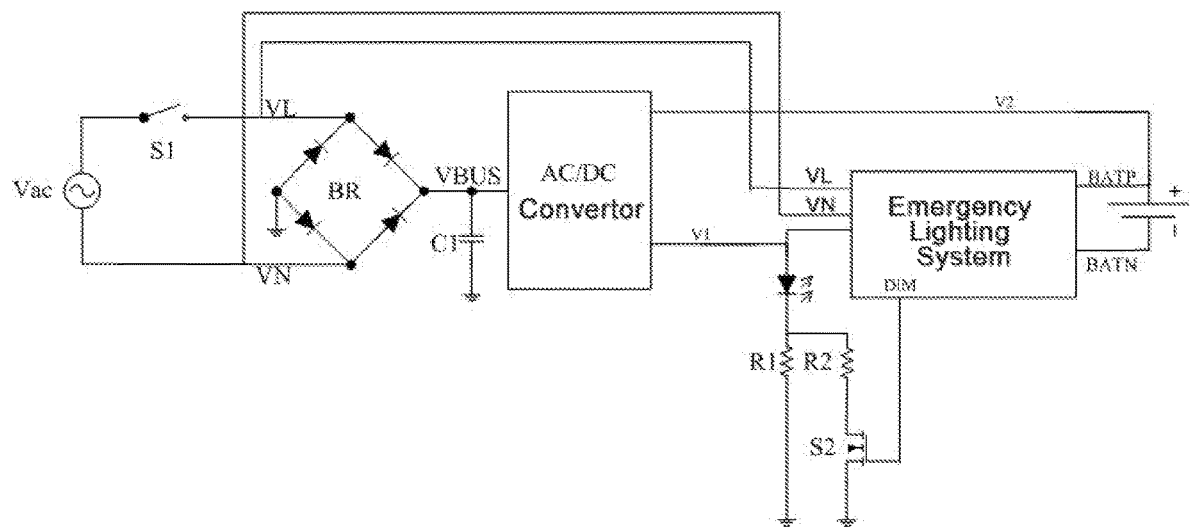
FIG. 2 is a schematic diagram of a circuit for controlling the brightness of an emergency lighting luminaire by a switch of the present invention.
Figure 3:
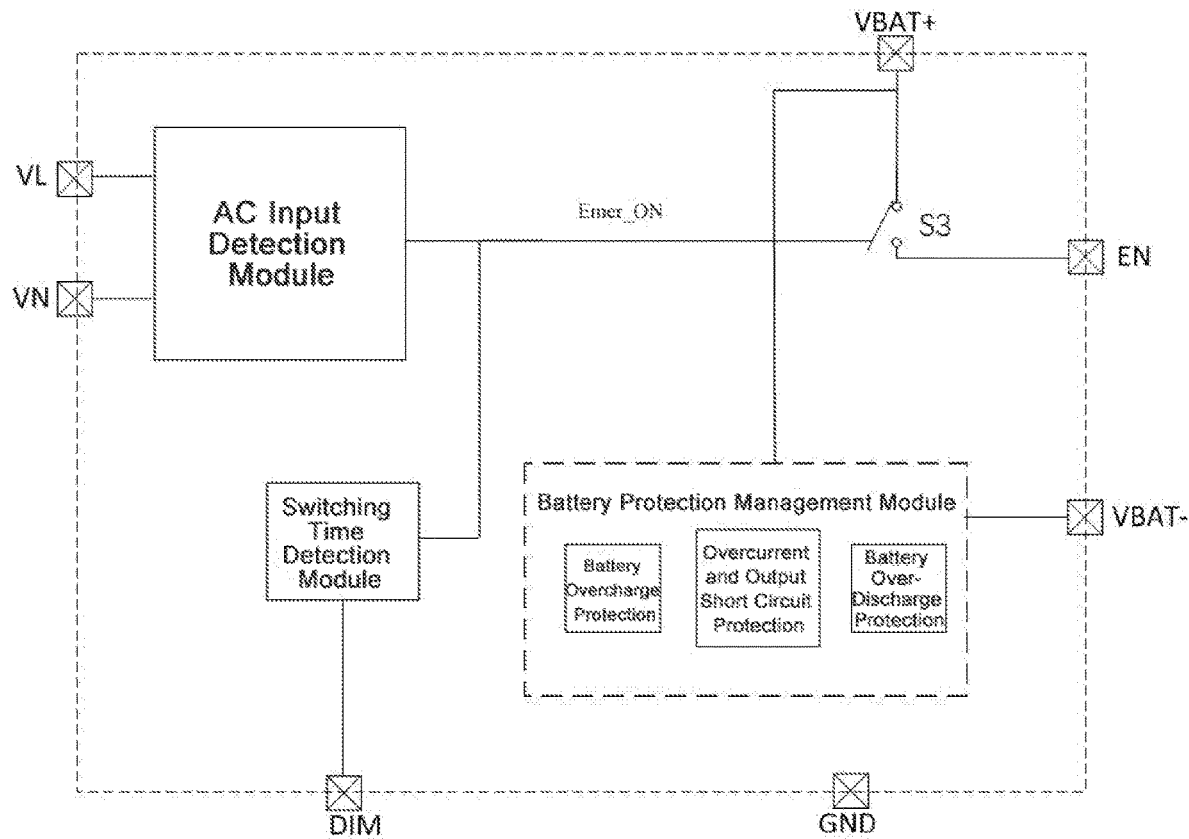
FIG. 3 is an internal schematic diagram of an emergency lighting system of the present invention.

As can be seen in FIGS. 2 and 3, a circuit for controlling the brightness of an emergency lighting luminaire by a switch, includes an emergency lighting system and an AC/DC converter. An output terminal of the emergency lighting system is electrically connected to an LED load, and the other output terminal DIM of the emergency lighting system is electrically connected to a switch S2. The switch S2 is controlled by the emergency lighting system. The emergency lighting system includes an AC input detection module, a switching time detection module and a lithium battery. The AC input detection module is electrically connected to a neutral wire VN and a live wire VL and is used for detecting AC network voltage and so the state of a power network switch S1. The switching time detection module is electrically connected between an output terminal of the AC input detection module and the output terminal DIM. An output terminal of the AC/DC converter is electrically connected to a positive electrode of the lithium battery, the other output terminal of the AC/DC converter is electrically connected to the LED load. The LED load is connected to ground after being connected to a resistor R1 in series. A resistor R2 is connected in series with the switch S2 and then connected in parallel with the resistor R1.

The AC/DC converter converts AC voltage/current to direct current (DC) voltage/current. When the AC network normally supplies power, the output terminal V1 of the AC/DC converter supplies power to the LED load, and the output terminal V1 of the AC/DC converter also charges the lithium battery of the emergency lighting system.

The emergency lighting system further includes a battery protection management module. The battery protection management module is electrically connected to a positive end and a negative end of the lithium battery. The battery protection management module includes a battery overcharge protection module, an overcurrent and output short circuit protection module and a battery over-discharge protection module. The battery protection management module can control the voltage of the battery during charging, discharging and protection of the battery.

Among them, the lithium battery is connected to the switch S3. When the switch S3 is closed, the output terminal EN of the emergency lighting system is short circuited with VBAT+, and the voltage of the output terminal EN of the emergency lighting system is equal to the voltage of the lithium battery. When the switch S3 is open, the output state of the output terminal EN of the emergency lighting system is in the high resistance state.

The circuit further includes a rectifier bridge BR. Two AC input terminals of the rectifier bridge BR are connected to the live wire VL and the neutral wire VN, respectively. The live wire VL is connected to the AC input terminal of the rectifier bridge BR through the switch S1. An output positive terminal of the rectifier bridge BR is connected to the VBUS interface, and an output negative terminal of the rectifier bridge BR is connected to ground. The VBUS interface is connected to a capacitor C1, and an input terminal of the AC/DC converter.

When the switch S1 is closed, the AC input detection module detects that the impedance between the live wire VL and the neutral wire VN is in a low resistance state. When the switch S1 is open the AC input detection module detects that the impedance between the live wire VL and the neutral wire VN is in a high resistance state. The switching time detection module detects a time period T for maintaining the impedance between the live wire VL and the neutral wire VN in the high resistance state by a "low resistance to high resistance to low resistance" state switching mode so as to output the voltage of the DIM terminal.

The switching time detection module is configured to predetermine a time Toff. When the time period T is less than the time Toff, the DIM terminal outputs a low level, and when the time period T is greater than or equal to the time Toff, the DIM terminal outputs a high level.

When the DIM terminal outputs the low level, the emergency lighting system opens the switch S2. When the DIM terminal outputs the high level, the emergency lighting system closes the switch S2.

Figure 4:
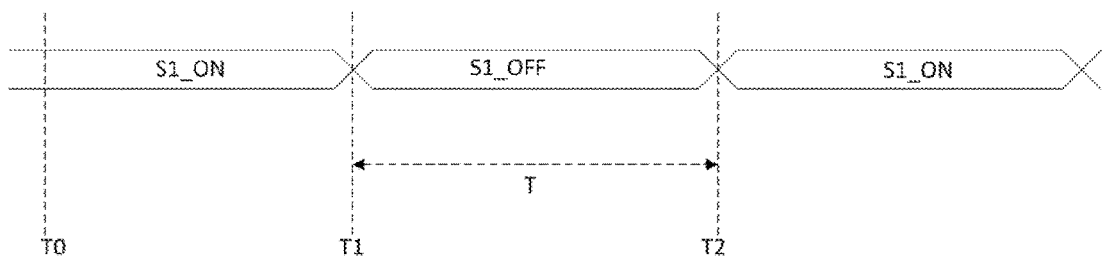
FIG. 4 is a schematic diagram of the time period T described of an embodiment.

Referring to FIG. 4, the control process is described in detail as follows.

When the initial state of the switch S1 is closed, and the supply of the AC network is interrupted. Additionally, the AC input detection module detects that there is no AC high-voltage signal on the live wire VL or the neutral wire VN. Also, since the switch S1 is closed, the impedance between the live wire VL and the neutral wire VN is low, so the AC input detection module determines that the system is in the emergency lighting state.

At the T1 moment, the state of the switch S1 changes to open. At this time, the AC input detection module cannot detect the AC high voltage signal of the live wire VL or the neutral wire VN because the switch S1 is open, and the resistance between the live wire VL and the neutral wire VN is in the high resistance state due to the open state of the switch S1. The AC input detection module defines the state of the system as the open state of the switch S1.

The state of the switch S1 is closed, and the supply of the AC network is interrupted, then the system re-enters the emergency lighting state according to the previous definition. Further, the AC input detection module is used to detect the AC input state and the state of the switch S1. According to the AC input state and the state of the switch S1, the closed/open state of the switch S3 is controlled. At the same time, the Emer_ON signal is output according to the AC input state. When no AC input voltage is detected, the switch S1 is closed, and the resistance between the live wire VL and the neutral wire VN is in the low resistance state, Emer_ON=1; otherwise, Emer_ON=0.

The switching time detection module is used to detect the interval time between the two signals of Emer_ON=1. When the interval time between the two signals of Emer_ON=1 is less than the internal Toff time, the switching time detection module outputs a signal of DIM=0. When the interval time between the two signals of Emer_ON=1 is greater than or equal to the Toff time, the switching time detection module outputs a signal of DIM=1.

The DIM is used to control the state of the switch S2, when DIM=0, the emergency lighting system opens the switch S2. When DIM=1, the emergency lighting system closes the switch S2.

The switch S2 is used to control the current limiting resistor of the LED load. When the switch S2 is closed, the current limiting resistor of the LED load is R1//R2. When the switch S2 is open, the current limiting resistor of the LED load is R1. Thus, the switch S2 can successfully control the current limiting resistor of the LED load. When the input voltage is constant, the current of the LED load will change with the change of the current limiting resistor, and the output power is adjusted to achieve the purpose of dimming.

A method for controlling the brightness of an emergency lighting luminaire by a switch, using the above circuit, wherein the emergency lighting system changes the current limiting resistor of the LED load by controlling the state of the switch S2, thereby changing the brightness of the LED load. When the switch S2 is open, the current limiting resistor of the LED load is R1; when the switch S2 is closed, the current limiting resistor of the LED load is R1//R2.

Thus, during the emergency lighting state, the emergency lighting system defines the switch action as the output power when the system needs to change the emergency work. By controlling the switch S2, the current limiting resistor of the LED load is changed from R1//R2 to be R1, so as to change the output current of the LED load, thereby achieving the dimming function in the emergency working state.

Although the embodiments of the present invention have been shown and described, it should be understood to those of ordinary skill in the art that a variety of changes, substitutions and modifications can be made to these embodiments without departing from the principle and spirit of the present invention. Also, the scope of the present invention is limited by the appended claims and the equivalents thereof.

What is claimed is:

1. A circuit for controlling charging of an emergency lighting luminaire by a switch, comprising an emergency lighting system and an AC/DC converter, wherein:
    a first output terminal of the emergency lighting system is electrically connected to an LED, a second output terminal of the emergency lighting system is electrically connected to a switch, and the switch is controlled by the emergency lighting system;
    the emergency lighting system comprises an AC input detection module, a switching time detection module and a lithium battery, wherein
        the AC input detection module is electrically connected to a neutral wire and a live wire for detecting AC network voltage and a state of a power network switch;
        the switching time detection module is electrically connected between an output terminal of the AC input detection module and the output second terminal;
        a first output terminal of the AC/DC converter is electrically connected to a positive electrode of the lithium battery, and a second output terminal of the AC/DC converter is electrically connected to the LED;
        the LED is connected to a first resistor in series and then connected to ground; and
        a second resistor is connected to the switch in series and then connected to the first resistor in parallel.

2. The circuit according to claim 1, wherein the emergency lighting system further comprises a battery protection management module, the battery protection management module is electrically connected to a positive end and a negative end of the lithium battery, and the battery protection management module comprises a battery overcharge protection module, an overcurrent and output short circuit protection module and a battery over-discharge protection module.

3. The circuit according to claim 1, further comprising a rectifier bridge, wherein
    a first AC input terminal of the rectifier bridge is connected to the neutral wire, the live wire is connected to a second AC input terminal of the rectifier bridge through the power network switch, an output positive terminal of the rectifier bridge is connected to a voltage bus (VBUS) interface, an output negative terminal of the rectifier bridge is connected to ground, the VBUS interface is connected to a capacitor, and the VBUS interface is connected to an input terminal of the AC/DC converter.

4. The circuit according to claim 1, wherein, when the power network switch is closed, the AC input detection module detects that an impedance between the live wire and the neutral wire is in a low resistance state; when the power network switch is open, the AC input detection module detects that the impedance between the live wire and the neutral wire is in a high resistance state.

5. The circuit according to claim 4, wherein, the switching time detection module is configured to predetermine a time, when the switching time detection module detects that a time period for maintaining the impedance between the live wire and the neutral wire in the high resistance state by a "low resistance to high resistance to low resistance" state switching mode is less than the time, the second output terminal of the emergency lighting system outputs a low level, and when the time period is greater than or equal to the time, the second output terminal of the emergency lighting system outputs a high level.

6. The circuit according to claim 5, wherein, the second output terminal of the emergency lighting system outputs the low level, the emergency lighting system controls the switch to be opened; the second output terminal of the emergency lighting system outputs the high level, the emergency lighting system controls the switch to be closed.

7. A method for controlling the brightness of an emergency lighting luminaire by a switch, comprising;
using the circuit for controlling the brightness of the emergency lighting luminaire by the switch according to claim 1, wherein the emergency lighting system changes a current limiting resistor of the LED by controlling the state of the switch, and a brightness of the LED is changed by controlling the current limiting resistor of the LED.

8. The method according to claim 7, when the switch is opened, the current limiting resistor of the LED is the first resistor; when the switch is closed, the current limiting resistor of the LED is an equivalent resistor of connecting the first resistor connected to the second resistor in parallel.

9. The circuit according to claim 2, further comprising a rectifier bridge, wherein
a first AC input terminal of the rectifier bridge is connected to the neutral wire, the live wire is connected to a second AC input terminal of the rectifier bridge through the power network switch, an output positive terminal of the rectifier bridge is connected to a VBUS interface, an output negative terminal of the rectifier bridge is connected to ground, the VBUS interface is connected to a capacitor, and the VBUS interface is connected to an input terminal of the AC/DC converter.

10. The method according to claim 7, wherein the emergency lighting system further comprises a battery protection management module, the battery protection management module is electrically connected to a positive end and a negative end of the lithium battery, and the battery protection management module comprises a battery overcharge protection module, an overcurrent and output short circuit protection module and a battery over-discharge protection module.

11. The method according to claim 7, further comprising a rectifier bridge, wherein
a first AC input terminal of the rectifier bridge is connected to the neutral wire, the live wire is connected to a second AC input terminal of the rectifier bridge through the power network switch, an output positive terminal of the rectifier bridge is connected to a VBUS interface, an output negative terminal of the rectifier bridge is connected to ground, the VBUS interface is connected to a capacitor, and the VBUS interface is connected to an input terminal of the AC/DC converter.

12. The method according to claim 7, wherein, when the power network switch is closed, the AC input detection module detects that an impedance between the live wire and the neutral wire is in a low resistance state; when the power network switch is open, the AC input detection module detects that the impedance between the live wire and the neutral wire is in a high resistance state.

13. The method according to claim 12, wherein, the switching time detection module is configured to predetermine a time, when the switching time detection module detects that a time period for maintaining the impedance between the live wire and the neutral wire in the high resistance state by a "low resistance to high resistance to low resistance" state switching mode is less than the time, the second output terminal of the emergency lighting system outputs a low level, and when the time period is greater than or equal to the time, the second output terminal of the emergency lighting system outputs a high level.

14. The method according to claim 13, wherein, the second output terminal of the emergency lighting system outputs the low level, the emergency lighting system controls the switch to be opened; the second output terminal of the emergency lighting system outputs the high level, the emergency lighting system controls the switch to be closed.

* * * * *